(12) United States Patent
Pazandak

(10) Patent No.: US 11,916,951 B2
(45) Date of Patent: Feb. 27, 2024

(54) MOBILE DEVICE MANAGEMENT FOR DETECTING AND REMEDIATING COMMON VULNERABILITIES AND EXPOSURES

(71) Applicant: JAMF Software, LLC, Minneapolis, MN (US)

(72) Inventor: Kyle Pazandak, Dayton, MN (US)

(73) Assignee: JAMF Software, LLC, Minneapolis, MN (US)

( * ) Notice: Subject to any disclaimer, the term of this patent is extended or adjusted under 35 U.S.C. 154(b) by 354 days.

(21) Appl. No.: 17/347,375

(22) Filed: Jun. 14, 2021

(65) Prior Publication Data

US 2022/0400132 A1 Dec. 15, 2022

(51) Int. Cl.
  *H04L 29/00* (2006.01)
  *H04L 9/40* (2022.01)
  *H04W 12/122* (2021.01)

(52) U.S. Cl.
  CPC .......... *H04L 63/1433* (2013.01); *H04L 63/20* (2013.01); *H04W 12/122* (2021.01)

(58) Field of Classification Search
  CPC .. H04L 63/1433; H04L 63/20; H04W 12/122; H04W 12/37
  See application file for complete search history.

(56) References Cited

U.S. PATENT DOCUMENTS

| | | | |
|---|---|---|---|
| 7,028,228 B1 * | 4/2006 | Lovy ...................... | H04L 43/10 714/57 |
| 7,225,249 B1 * | 5/2007 | Barry .................... | G06F 16/958 709/227 |
| 10,963,347 B1 * | 3/2021 | Chen ................... | G06F 3/04842 |
| 11,388,195 B1 * | 7/2022 | McCaffery ............. | H04L 63/20 |
| 11,477,077 B1 * | 10/2022 | Berg ................... | G06F 11/3051 |
| 2004/0193918 A1 * | 9/2004 | Green ................. | H04L 63/1433 726/22 |
| 2006/0200658 A1 * | 9/2006 | Penkethman ..... | H04M 1/72406 713/2 |
| 2007/0050777 A1 * | 3/2007 | Hutchinson ......... | G06F 11/0781 718/104 |
| 2008/0141272 A1 * | 6/2008 | Borgendale ............ | G06Q 40/04 719/313 |

(Continued)

*Primary Examiner* — Don G Zhao
(74) *Attorney, Agent, or Firm* — Benesch, Friedlander, Coplan & Aronoff LLP

(57) ABSTRACT

According to certain aspects of the present disclosure, a computer-implemented method is provided. The method includes receiving, at a mobile device management server from a threat feed server, at least one security statement. The method includes parsing the at least one security statement into parsed information. The method includes creating a custom threat feed of common vulnerabilities and exposures with at least the parsed information. The method includes selectively creating an alert associated with one common vulnerability and exposure of the common vulnerabilities and exposures, wherein the alert comprises a remediation action associated with the one common vulnerability and exposure. The method includes determining at least one managed device, managed by the mobile device management server, and associated with the remediation action of the alert. Systems and machine-readable media are also provided.

20 Claims, 8 Drawing Sheets

(56) References Cited

U.S. PATENT DOCUMENTS

| | | | |
|---|---|---|---|
| 2009/0069047 A1* | 3/2009 | Russell | H04M 3/2281 |
| | | | 455/558 |
| 2009/0271504 A1* | 10/2009 | Ginter | H04L 63/02 |
| | | | 709/220 |
| 2013/0283336 A1* | 10/2013 | Macy | G06F 21/577 |
| | | | 726/1 |
| 2014/0089848 A1* | 3/2014 | Smith | H04L 67/1095 |
| | | | 715/808 |
| 2014/0120901 A1* | 5/2014 | Ward | H04W 4/14 |
| | | | 455/419 |
| 2014/0327547 A1* | 11/2014 | Johnson | G08B 27/006 |
| | | | 340/601 |
| 2015/0256277 A1* | 9/2015 | Johnson | G08B 27/006 |
| | | | 340/601 |
| 2016/0277929 A1* | 9/2016 | Liu | H04L 69/324 |
| 2016/0294605 A1* | 10/2016 | Searle | H04L 41/069 |
| 2016/0294614 A1* | 10/2016 | Searle | H04L 67/34 |
| 2017/0034023 A1* | 2/2017 | Nickolov | H04L 43/0817 |
| 2019/0146861 A1* | 5/2019 | Joshi | G06F 11/0793 |
| | | | 714/37 |
| 2019/0197444 A1* | 6/2019 | Smith | G06T 19/006 |
| 2019/0205820 A1* | 7/2019 | Nuthi | G06K 7/10297 |
| 2020/0267515 A1* | 8/2020 | Stapleford | H04W 4/14 |
| 2020/0285761 A1* | 9/2020 | Buck | G06F 21/604 |
| 2020/0304503 A1* | 9/2020 | Zerrad | H04W 12/67 |
| 2022/0114251 A1* | 4/2022 | Guim Bernat | G06F 1/3228 |
| 2022/0188450 A1* | 6/2022 | Singh | G06F 21/46 |
| 2022/0224722 A1* | 7/2022 | Sun | H04L 63/20 |

* cited by examiner

| FEED | | | | | |
|---|---|---|---|---|---|
| Threat Feed Source | | | | | |
| Custom | | | | | |
| New Feed | | | 1-10 of 29 ← 1 → | | |
| OTHER | Search | | | | |
| Alerts | # | SOURCE | SEVERITY | SUMMARY | PLATFORMS | PUBLISHED DATE |
| About | 1 | Threat Feed Source | Critical | An Issue was discovered in the Application_that may expose user Data | MacOS, iOS, iPadOS, tvOS | 2021-04-30 |
| | 2 | Vendor | Medium | An Issue was discovered in the Application_that may escalation of privileges | iOS, IPadOS, tvOS | 2021-03-27 |
| | 3 | Threat Feed Server | Low | The Application_may allow arbitrary code to excute | iOS, IPadOS | 2021-01-02 |
| | 4 | Threat Feed Server | Low | An Issue was discovered where cross site scripting may expose user data | MacOS | 2020-12-14 |
| | 5 | Vendor | High | An Issue was discovered in_where a user could escalate to admin | MacOS | 2019-10-01 |
| | 6 | Threat Feed Server | High | An attacker can leverage this to issue to read protected user information | iOS, IPadOS, tvOS | 2021-02-25 |
| | 7 | Vendor | Critical | An Issue with encryption with the application_allows user sessions to be hijacked | MacOS | 2020-10-01 |
| | 8 | Threat Feed Server | Low | An Issue with with the application_allows user to bypass authorization on select endpoints | MacOS | 2020-09-17 |
| | 9 | Threat Feed Server | Low | An Issue with the web client allows user to access information about the application configuration | iOS, IPadOS | 2021-03-16 |
| | 10 | Threat Feed Server | High | A remote unauthenticated attacker could potentially exploit this vulnerability to overwrite a specific payloads | MacOS, iOS, PadOS | 2021-06-01 |

FIG. 4A

| FEED | | | | | | |
|---|---|---|---|---|---|---|
| ☰ Threat Feed Source | Alerts | | | | | (+ New Alert) |
| ☰ Custom | 🔍 Search | | | 1-10 of 29 ← 1 → | | ✦ |
| New Feed | ID ⇕ ACTIVE | ⇕ NAME | ⇕ SUMMARY | | ⇕ ACTIONS | ⇕ Last Action |
| OTHER | 1 On | ABC Company alerts | Vendor=ACME | | iPhone, iPad | 2020-10-07 |
| 🔔 Alerts | 2 On | XYZ Company alerts | On CVSS > 9.0 and Platform=MacOS | | Email | 2020-10-03 |
| ⓘ About | 3 Off | QWE Company alerts | (Platform=MacOS or Platform=IPhone_OS)and CVSS>5.0 | | Email | 2020-10-02 |

| FEED | ← New CVE Alert | | | Enabled ⊂⊃ | ⊗ Cancel | 🖫 Save |
|---|---|---|---|---|---|---|
| ▤ Threat Feed Source | Tracker Criteria Trigger Actions | | | | | |
| ▤ Custom | | 58 | | | | |
| New Feed | AND/OR | ⇩ CRITERIA 58a | ⇩ OPERATOR 58b | ⇩ VALUE 58c | | |
| | ☐ | Vendor | Is | Acme CO | | |
| OTHER | and ▾ | CVSS | Greater than | 8.0 | | |
| ⌂ Alerts | or ▾ | Severity | Greater than | High | | |
| ⓘ About | and ▾ | Patch Policy | Exists | True | | |
| | | | + Add | | | |

FIG. 4D

| FEED | ← New CVE Alert | Enabled ⊂⊃ | ⊗ Cancel | 🖫 Save |
|---|---|---|---|---|
| ▤ Threat Feed Source | Tracker Criteria Trigger Actions | | | |
| ▤ Custom | 60 | | | |
| New Feed | ☑ CVE Created | | | |
| | ☐ CVE Update | | | |
| OTHER | ☐ Patch Policy | | | |
| ⌂ Alerts | | | | |
| ⓘ About | | | | |

MOBILE DEVICE MANAGEMENT FOR DETECTING AND REMEDIATING COMMON VULNERABILITIES AND EXPOSURES

TECHNICAL FIELD

The present disclosure generally relates to management systems of mobile devices, and more specifically relates to mobile device management for detecting and remediating common vulnerabilities and exposures.

BACKGROUND

Security vulnerabilities to software suites installed within an organization's environment are continually growing. For example, with an increasing trend of Bring Your Own Apps (BYOA), end users associated with an organization are able to install applications on their devices, whether an organization owned device or a personally owned device, causing the rapid growth of application libraries and services that are installed within the environment of such an organization. As a result of both the application libraries and the number of threat disclosures growing, the process of responding to security vulnerabilities related to the application libraries and services can be time consuming, inefficient, and, often times, unmanageable in a manual fashion.

The description provided in the background section should not be assumed to be prior art merely because it is mentioned in or associated with the background section. The background section may include information that describes one or more aspects of the subject technology.

SUMMARY

The present disclosure provides systems and methods for identifying and defining security vulnerabilities to customize security postures in an organizational environment and create solutions to remediate such security vulnerabilities.

According to certain aspects of the present disclosure, a computer-implemented method is provided. The method includes receiving, at a mobile device management server from a threat feed server, at least one security statement. The method includes parsing the at least one security statement into parsed information. The method includes creating a custom threat feed of common vulnerabilities and exposures with at least the parsed information. The method includes selectively creating an alert associated with one common vulnerability and exposure of the common vulnerabilities and exposures, wherein the alert comprises a remediation action associated with the one common vulnerability and exposure. The method includes determining at least one managed device, managed by the mobile device management server, and associated with the remediation action of the alert.

According to other aspects of the present disclosure, a system is provided. The system includes a memory comprising instructions and a processor configured to execute the instructions which, when executed, cause the processor to receive, from a threat feed server, at least one security statement. The processor is configured to execute the instructions which, when executed, cause the processor to parse the at least one security statement into parsed information. The processor is configured to execute the instructions which, when executed, cause the processor to create a custom threat feed of common vulnerabilities and exposures with at least the parsed information. The processor is configured to execute the instructions which, when executed, cause the processor to selectively create an alert associated with one common vulnerability and exposure of the common vulnerabilities and exposures, wherein the alert comprises a remediation action associated with the one common vulnerability and exposure. The processor is configured to execute the instructions which, when executed, cause the processor to determine at least one managed device, managed by the mobile device management server, and associated with the remediation action of the alert. The processor is configured to execute the instructions which, when executed, cause the processor to transmit, based on determining the at least one managed device, a first message to a push notification server that causes the push notification server to notify the at least one managed device to communicate with the mobile device management server. The processor is configured to execute the instructions which, when executed, cause the processor to transmit, responsive to the at least one managed device communicating with the mobile device management server based on the push notification, a second message to the at least one managed device, the second message comprising at least commands to execute instructions associated with the remediation action.

According to other aspects of the present disclosure, a non-transitory machine-readable storage medium comprising machine-readable instructions for causing a processor to execute a method is provided. The method includes receiving, at a mobile device management server from a threat feed server, at least one security statement. The method includes parsing, at the mobile device management server, the at least one security statement into parsed information. The method includes creating, at the mobile device management server, a custom threat feed of common vulnerabilities and exposures with at least the parsed information. The method includes selectively creating, at the mobile device management server, an alert associated with one common vulnerability and exposure of the common vulnerabilities and exposures, wherein the alert comprises a remediation action associated with the one common vulnerability and exposure. The method includes determining, at the mobile device management server, at least one managed device managed by the mobile device management server and associated with the remediation action of the alert. The method includes transmitting, based on determining the at least one managed device, a first message to a push notification server that causes the push notification server to notify the at least one managed device to communicate with the mobile device management server. The method includes transmitting, responsive to the at least one managed device communicating with the mobile device management server based on the push notification, a second message to the at least one managed device, the second message comprising at least commands to execute instructions associated with the remediation action.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to particular settings, these are examples only and are not to be considered limiting. The teachings of the present disclosure may be applied to other mobile device environments, including but not limited to teaching environments, corporate environments, home environments, retail environments, healthcare environments, and other organizational environments well-known in the industry. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 4A-4E are example illustrations associated with the example process of FIG. 3.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed systems and methods provide a solution to traditional systems and processes of identifying and defining security vulnerabilities and exposures, which can be time consuming and involve inefficient conventions. For example, the disclosed systems and methods monitor security vulnerabilities and exposures of an organizational environment by, for example, descriptively defining such monitored security vulnerabilities and exposures for selectively employing security actions to maintain a security posture that protects the organizational environment. In certain aspects, the disclosed systems and methods enable a mobile device management server to maintain and enforce software update policies based on selectively defined conditions for employing security actions.

The disclosed systems and methods address a technical problem tied to computer technology and arising in the realm of mobile device management, namely the technical problem of monitoring security vulnerabilities and exposures in organizational environments and remediating such security vulnerabilities and exposures in a time efficient manner. The disclosed systems and methods solve this technical problem by efficiently identifying and defining security vulnerabilities and exposures and by increasing the speed at which such security vulnerabilities and exposures are remediated in order to increase network security.

Figure 1:
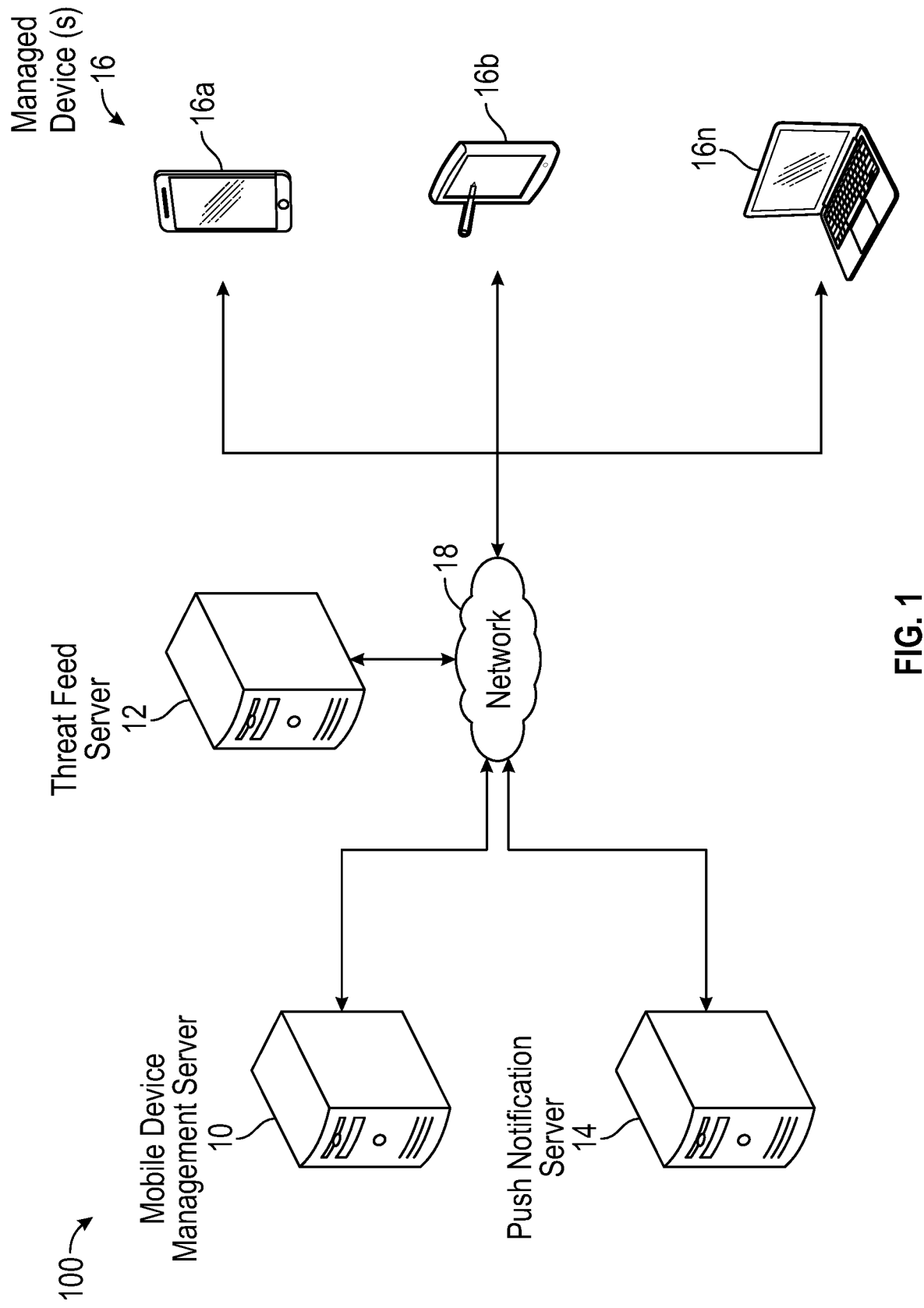
FIG. 1 illustrates an example architecture for detecting and remediating common vulnerabilities and exposures of managed devices.

FIG. 1 illustrates an example architecture 100 for identifying and defining security vulnerabilities to customize security postures in an organizational environment and create solutions to remediate such security vulnerabilities. For example, the architecture 100 includes a mobile device management server 10, a threat feed server 12, a push notification server 14, and at least one managed device 16, such as managed devices 16a, 16b . . . 16n, all connected over a network 18. In certain aspects, the mobile device management server 10 may be connected to the push notification server 14 over a separate network.

The mobile device management server 10 can be any device having an appropriate processor, memory, and communications capability for communicating with the threat feed server 12, the push notification server 14, and the at least one managed device 16. For purposes of load balancing, the mobile device management server 10 may include multiple servers. The threat feed server 12 can be any device having an appropriate processor, memory, and communications capability for communicating with the mobile device management server 10. The push notification server 14 can be any device having an appropriate processor, memory, and communications capability for communicating with the mobile device management server 10 and the at least one managed device 16. The at least one managed device 16, such as the first managed device 16a, to which the mobile device management server 10 communicates with over the network 18 via the push notification server 14, can be, for example, a tablet computer, a mobile phone, a mobile computer, a laptop computer, a portable media player, an electronic book (eBook) reader, or any other device having appropriate processor, memory, and communications capabilities. In certain aspects, the mobile device management server 10 and the push notification server 14 can be a cloud computing server of an infrastructure-as-a-service (IaaS) and be able to support a platform-as-a-service (PaaS) and software-as-a-service (SaaS) services.

It should be noted that the present disclosure is not limited to any particular configuration or number of managed devices, such as the at least one managed device 16. In certain aspects, a different number of managed devices may be present.

The network 18 can include, for example, any one or more of a personal area network (PAN), a local area network (LAN), a campus area network (CAN), a metropolitan area network (MAN), a wide area network (WAN), a broadband network (BBN), the Internet, and the like. Further, the network 18 can include, but is not limited to, any one or more of the following network topologies, including a bus network, a star network, a ring network, a mesh network, a star-bus network, tree or hierarchical network, and the like.

Figure 2:
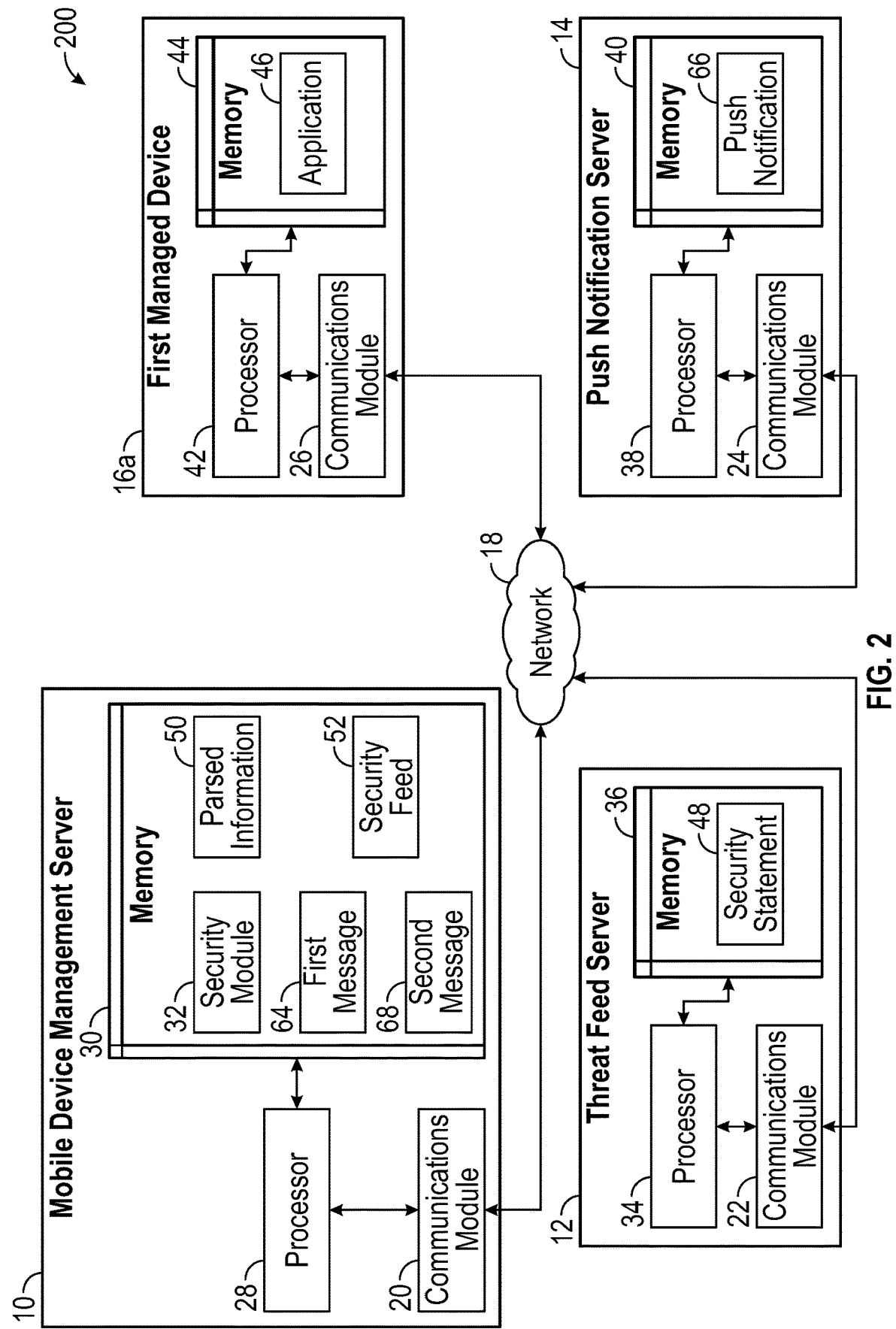
FIG. 2 is a block diagram illustrating an example mobile device management server, threat feed server, push notification server, and managed device from the architecture of FIG. 1 according to certain aspects of the disclosure.

FIG. 2 is a block diagram illustrating examples of the mobile device management server 10, the threat feed server 12, the push notification server 14, and the at least one managed device 16, such as the first managed device 16a, in the architecture of FIG. 1 according to certain aspects of the disclosure. It should be understood that while the mobile device management server 10 manages a plurality of managed devices, such as the at least one managed device 16, the first managed device 16a will be discussed in particular to simplify description of the present disclosure.

The mobile device management server 10, the threat feed server 12, the push notification server 14, and the first managed device 16a are connected over the network 18 via respective communications modules 20, 22, 24, 26. The communications modules 20, 22, 24, 26 are configured to interface with the network 18 to send and receive information, such as data, requests, responses, and commands to other devices on the network 18. The communications modules 20, 22, 24, 26 can be, for example, modems or Ethernet cards.

The mobile device management server 10 includes a processor 28, the communications module 20, and a memory 30 that includes a security module 32. The processor 28 of the mobile device management server 10 is configured to execute instructions, such as instructions physically coded into the processor 28, instructions received from software in the memory 30, or a combination of both. The mobile device management server 10 may correspond to hardware and/or software that implement mobile device management functions. While the mobile device management server 10 is illustrated as hosting the security module 32, it should be understood that the security module 32 could be hosted on a separate server that communicates with the mobile device management server 10.

The threat feed server 12 includes a processor 34, the communications module 22, and a memory 36. The processor 34 of the threat feed server 12 is configured to execute instructions, such as instructions physically coded into the processor 34, instructions received from software in the memory 36, or a combination of both. Although the threat feed server 12 is illustrated as a single server for ease of discussion, it should be understood that the teachings of the present disclosure apply to multiple threat feed servers and that each threat feed server may be associated with a separate entity. For example, the threat feed server 12 may be associated with an entity that compiles publicly known common vulnerabilities and exposures, an entity that supplies devices with software, or any other type of entity.

The push notification service 14 includes a processor 38, the communications module 24, and a memory 40. The processor 38 of the push notification service 14 is configured to execute instructions, such as instructions physically coded into the processor 38, instructions received from software in the memory 40, or a combination of both.

The first managed device 16a includes a processor 42, the communications module 26, and a memory 44. The processor 42 of the first managed device 16a is configured to execute instructions, such as instructions physically coded into the processor 42, instructions received from software in memory 44, or a combination of both. The memory 44 of the first managed device 16a may include an application 46.

It should be noted that the teachings of the present disclosure may be applied in various mobile device environments, including but not limited to educational settings, home environments, corporate environments, retail environments, healthcare environments, government environments, organization environments, and other environments well-known in the industry.

The mobile device management server 10 is configured to receive at least one security statement 48 from the threat feed server 12. The at least one security statement 48 is information about an unintended vulnerability or exposure of data associated with software and may be, but is not limited to, a common vulnerability and exposure object, a software update, a press release statement, and other publicly available or private statements associated with a software vendor about a software change that resolves an unintended security concern. In certain aspects, the at least one security statement 48 includes information associated with the software and may include, but is not limited to, a common vulnerability and exposure identifier, a security score, a severity level, software vendor comments, software vendor name, application name, operating system name, operating system version, vulnerability type, ease of exploit, configuration nodes, a publication date, a modification date, a declared configuration, software versions that may have been patched, guidelines for patching, and other information related to the software security concerns.

The mobile device management server 10, via the security module 32, is configured to monitor the threat feed server 12 in order to receive or collect the at least one security statement 48. In certain aspects, security module 32 of the mobile device management server 10 can selectively monitor, or receive from, the threat feed server 12 at selected intervals. After the mobile device management server 10 receives the at least one security statement 48, the security module 32 of the mobile device management server 10 is configured to store the at least one security statement 48 in the memory 30 for further processing. The security module 32 of the mobile device management server 10 is configured to parse the at least one security statement 48 into parsed information 50. For example, the security module 32 is configured to parse the at least one security statement 48 to identify the parsed information 50 such as, but not limited to, a common vulnerability and exposure identifier, a security score, a severity level, software vendor comments, software vendor name, application name, operating system name, operating system version, vulnerability type, ease of exploit, configuration nodes, a publication date, a modification date, a declared configuration, software versions that may have been patched, guidelines for patching, and other information related to the software security concerns.

The mobile device management server 10, via the security module 32, is configured to create a security feed 52 by utilizing the parsed information 50. For example, the security feed 52 can list common vulnerabilities and exposures identified by, but not limited to, common vulnerability and exposure identifier, severity level, software vendor comments, operating system name, operating system version, and publication date. Once the security feed 52 is created, the mobile device management server 10, via the security module 32, is configured to selectively create alerts 54 (shown in FIG. 4B) associated with the security feed 52 to, for example, track common vulnerabilities and exposures of the security feed 52 for remediation. The mobile device management server 10, via the security module 32, is configured to create the alerts 54 by selectively creating criteria 56 (shown in FIG. 4C) associated with the common vulnerabilities and exposures of the security feed 52. The criteria 56 is created by defining fields 58 (shown in FIG. 4C), which can include, but are not limited to, criteria field 58a, operator field 58b, value field 58c, and other well-known fields in the industry. As part of creating the alerts 54, the mobile device management server 10, via the security module 32, is configured to selectively create a trigger 60 (shown in FIG. 4D) selected from, but not limited to, creating a common vulnerability and exposure, updating an existing common vulnerability and exposure, and creating a remediation policy for the common vulnerability and exposure. Creation of the alerts 54 also includes the mobile device management server 10, via the security module 32, to selectively create a remediation action 62 (shown in FIG. 4E) associated with the common vulnerabilities and exposures of the security feed 52. In certain aspects, the remediation action 62 can be, but is not limited to, transmitting a notification (e.g., text message, email), transmitting commands to execute the remediation policy (e.g., patching, removing software titles, over-riding user-interaction options), and other well-known actions in the industry.

The mobile device management server 10, via the security module 32, is configured to identify devices being managed by the mobile device management server 10, such as the at least one managed device 16. The mobile device management server 10, via the security module 32, is configured to, after identifying the devices being managed, determine which of the identified devices, such as the at least one managed device 16, are vulnerable by comparing profiles of the identified devices based on the alerts 54. For example, when the criteria 56 agrees with the trigger 60 of the alert 54 the mobile device management server 10, via the security module 32, executes the remediation action 62. In certain aspects, the remediation action 62 is executed by the mobile device management server 10 transmitting a first message 64 to the push notification server 14 to transmit a push notification 66 to the managed devices, such as the first managed device 16a, that are identified as being vulnerable, to communicate with the mobile management server 10. In such aspects, in response to the managed devices, such as the first managed device 16a, communicating with the mobile device management server 10 based on the push notification 66, the mobile device management server 10 transmits a second message 68 to the first managed device 16a, which includes at least commands to execute instructions associated with the remediation action 62.

Figure 3:
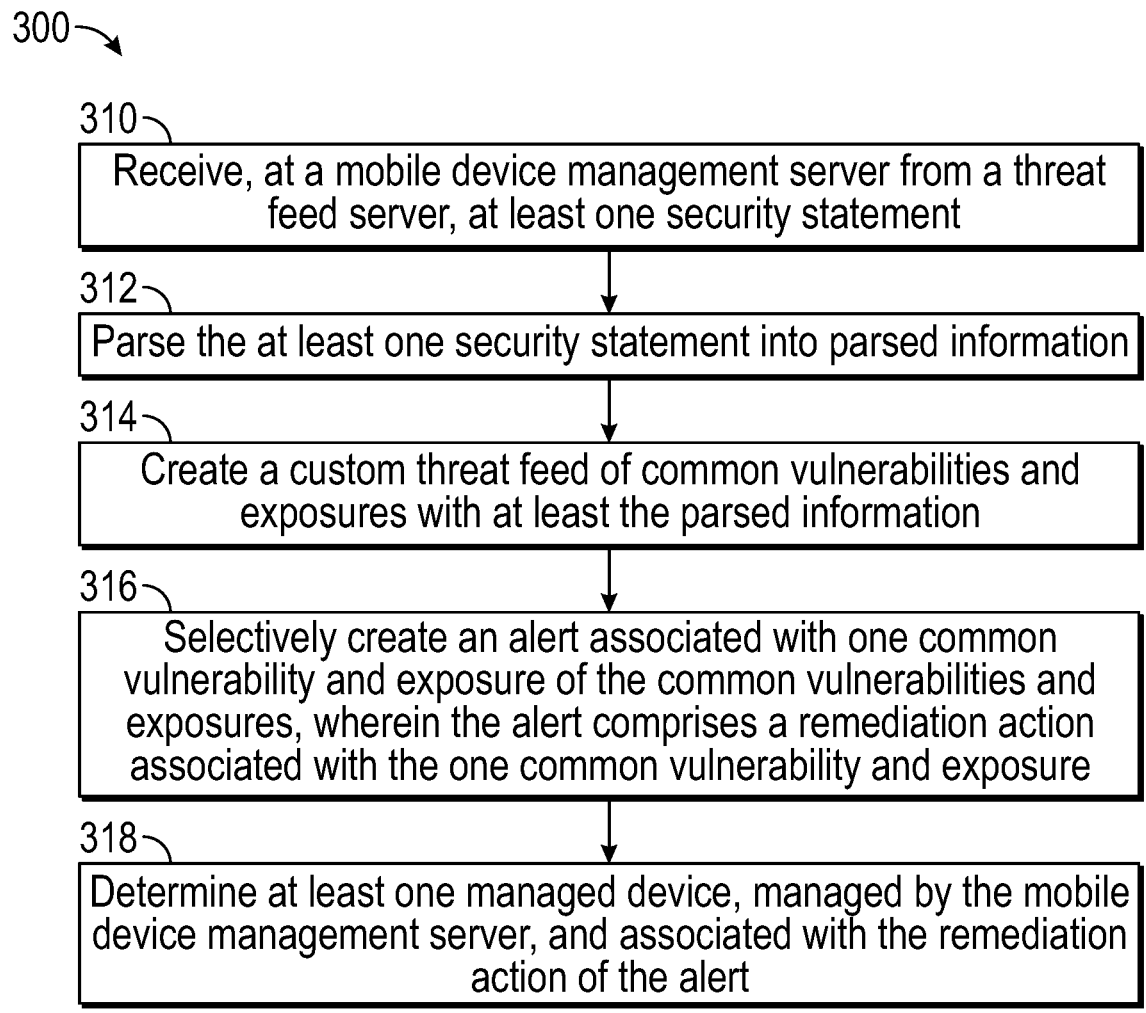
FIG. 3 illustrates an example process for using the example mobile device management server, threat feed server, push notification server, and managed device of FIG. 2.

FIG. 3 illustrates an example process 300 using the mobile device management server 10, the threat feed server 12, and the first managed device 16a of FIG. 2. While FIG. 3 is described with reference to FIG. 2, it should be understood that the process steps of FIG. 3 may be performed by other systems.

The process begins by proceeding to step 310 when the processor 28 of the mobile device management server 10 receives at least one security statement 48 from the threat feed server 12. As depicted at step 312, the processor 28 of the mobile device management server 10 parses the at least one security statement 48 into parsed information 50. At step 314, the processor 28 of the mobile device management server 10 creates a custom threat feed 52 of common vulnerabilities and exposures with at least the parsed information 50. The processor 28 of the mobile device management server 10 selectively creates an alert 54 associated with one common vulnerability and exposure of the common vulnerabilities and exposures, wherein the alert 54 comprises a remediation action 62 associated with the one common vulnerability and exposure, as illustrated at step 316. As depicted at step 318, the processor 28 of the mobile device management server 10 determines at least one managed device, such as the first managed device 16a, which is managed by the mobile device management server, and associated with the remediation action 62 of the alert 54.

In certain aspects, for example, the processor 28 of the mobile device management server 10 executes the remediation action 62 by transmitting a first message 64 to the push notification server 14 to transmit a push notification 66 to the at least one managed device, such as the first managed device 16a, that are identified as being vulnerable, to communicate with the mobile management server 10. In such aspects, for example, the processor 28 of the mobile device management server 10, in response to the at least one managed device, such as the first managed device 16a, communicating with the mobile device management server 10 based on the push notification 66, the mobile device management server 10 transmits a second message 68 to the first managed device 16a, which includes at least commands to execute instructions associated with the remediation action 62.

FIG. 3 sets forth the example process 300 using the mobile device management server 10, the threat feed server 12, and the first managed device 16a of FIG. 2. An example will now be described with reference to the example process of FIG. 3 and the example illustrations in FIGS. 4A-4E.

During operation, the processor 28 of the mobile device management server 10, via the security module 32, monitors at least one threat feed server, such as the threat feed server 12, at selected time intervals and receives or collects at least one security statement 48. For example, the mobile device management server 10 can receive the at least one security statement 48 including a list of common vulnerabilities and exposures objects that are from a publicly available threat feed server. As another example, the mobile device management server 10 can receive the at least one security statement 48, including a public or private statement, from a software vendor. The mobile device management server 10 stores the at least one security statement 48 in memory 30 for further processing. For example, the mobile device management server 10 parses the common vulnerabilities and exposure objects received in the list into parsed information 50 such as common vulnerability and exposure identifier, a security score, a severity level, software vendor comments, software vendor name, application name, operating system name, operating system version, vulnerability type, ease of exploit, configuration nodes, a publication date, a modification date, a declared configuration, software versions that may have been patched, guidelines for patching, and other information related to the software security concerns. As another example, the mobile device management server 10 parses the public statement, such as a press statement, which includes statements regarding a security issue found in a previous version of their operating system, to identify the operating system, the software version, and the security issue.

The mobile device management server 10 utilizes the parsed information 50 to create the security feed 52, as illustrated in FIG. 4A. For example, the security feed 52 can include the common vulnerability and exposure identifier, the security score, a summary, the operating system, and the date published. With the security feed 52 created, the mobile device management server 10 selectively creates alerts 54, as illustrated in FIG. 4B. The alerts 54 are created to track selected common vulnerabilities and exposures for remediation. For example, in creating the alerts 54, the mobile device management server 10 selectively creates the criteria 56, by defining the criteria field 58a, the operator field 58b, and the value field 58c, associated with the particular common vulnerability and exposure of the security feed 52. As illustrated in FIG. 4C, the criteria field 58a can be set to a vendor, the security score of the common vulnerability and exposure, the severity level of the common vulnerability and exposure, and the remediation policy associated with the common vulnerability and exposure. With further reference to FIG. 4C, the operator field 58b can be set to, for example, "is" or equal to, greater than, less than, and exists while the value field 58c can be set to, for example, the vendor name that is tracking the particular common vulnerability and exposure, the value of the security score of the common vulnerability and exposure, the value of the severity level of the common vulnerability and exposure, and the value of the remediation policy associated with the common vulnerability and exposure.

Figure 4E:
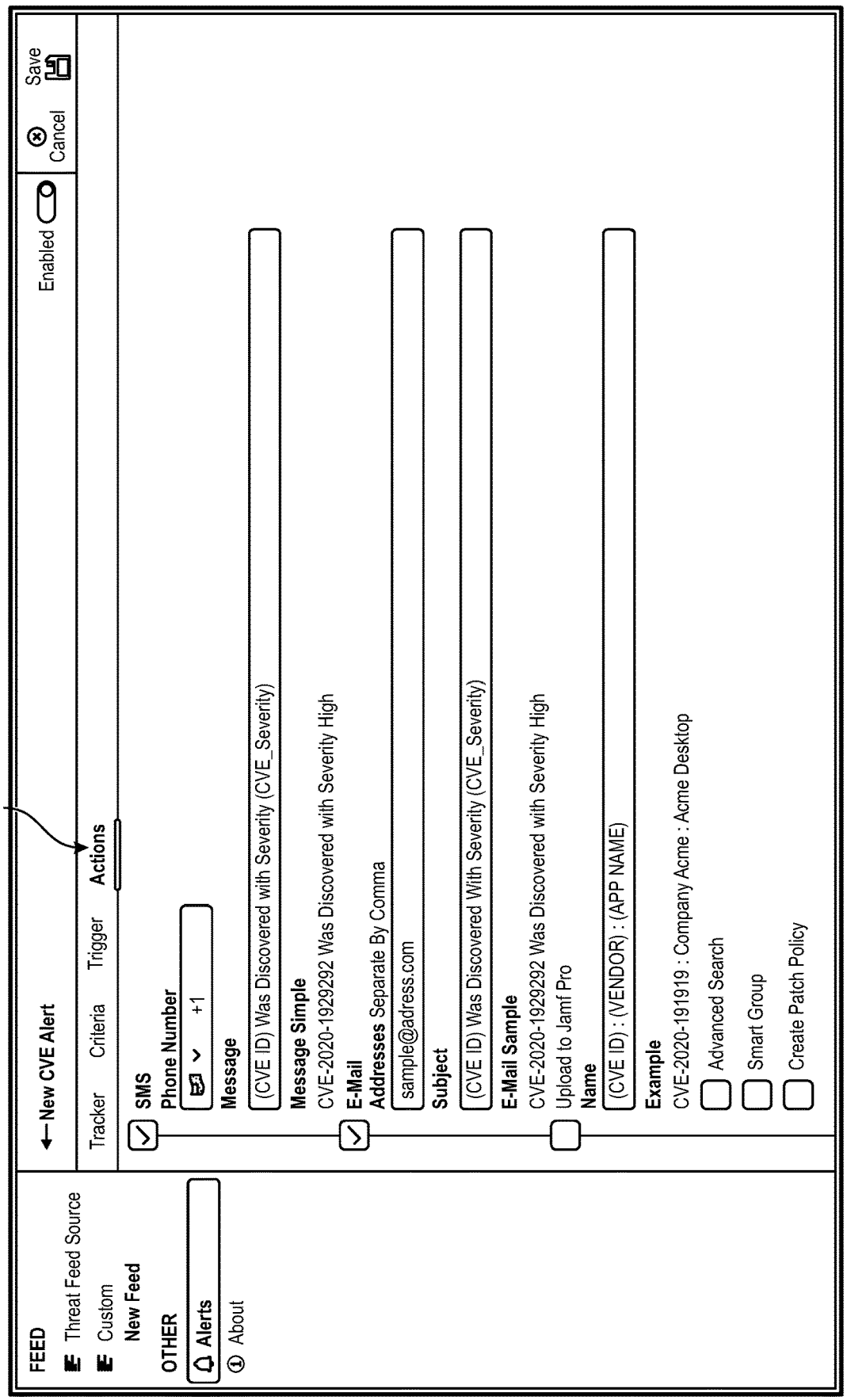

With reference to FIG. 4D, in further creating the alerts 54, the mobile device management server 10 selectively creates the trigger 60 from the selection of creating a common vulnerability and exposure, updating an existing common vulnerability and exposure, and creating a remediation policy for the common vulnerability and exposure. Further, when creating the alerts 54, the mobile device management server 10 selectively creates the remediation action 62 associated with the particular common vulnerability and exposure of the security feed 52, as illustrated in FIG. 4E. For example, with the selections of the criteria 58 and the trigger 60 created, the mobile device management server 10 executes the remediation action 62 when the criteria 58 and the trigger 60 agree. For example, when the criteria 58 and the trigger 60 agree and the trigger 60 is set to create the common vulnerability and exposure, the mobile device management server 10 transmits a first message 64 to the push notification server 14 to transmit the push notification 66 to the at least one managed device, such as the first managed device 16a, which is determined as being vulnerable, to communicate with mobile management device server 10. When communication between the mobile device management device server 10 is established based on the push notification 66, the mobile device management server 10 transmits the second message 68 to the first managed device 16a notifying that the particular common vulnerability and exposure was discovered and identifying the severity level. As another example, when the criteria 58 and the trigger 60 agree and the trigger 60 is set to creating the remediation policy for the common vulnerability and exposure, the mobile device management server 10 transmits a first message 64 to the push notification server 14 to transmit the push notification 66 to the at least one managed device, such as the first managed device 16a, which is determined as being vulnerable, to communicate with mobile management device server 10. When communication between the mobile device management device server 10 is established based on the push notification 66, the mobile device management server 10 transmits the second message 68 to the first managed device 16a, which includes commands to execute the remediation policy.

Although certain embodiments and workflows are described herein with reference to performing mobile device management for a single managed device, it should be understood that mobile device management may also be performed for multiple devices. For example, the mobile device management server 10 may select multiple managed devices or a group of managed devices. The first message 64, may identify multiple managed devices or a group of managed devices, and the push notification server 14 may send a push notification 66 to each managed device.

Figure 5:
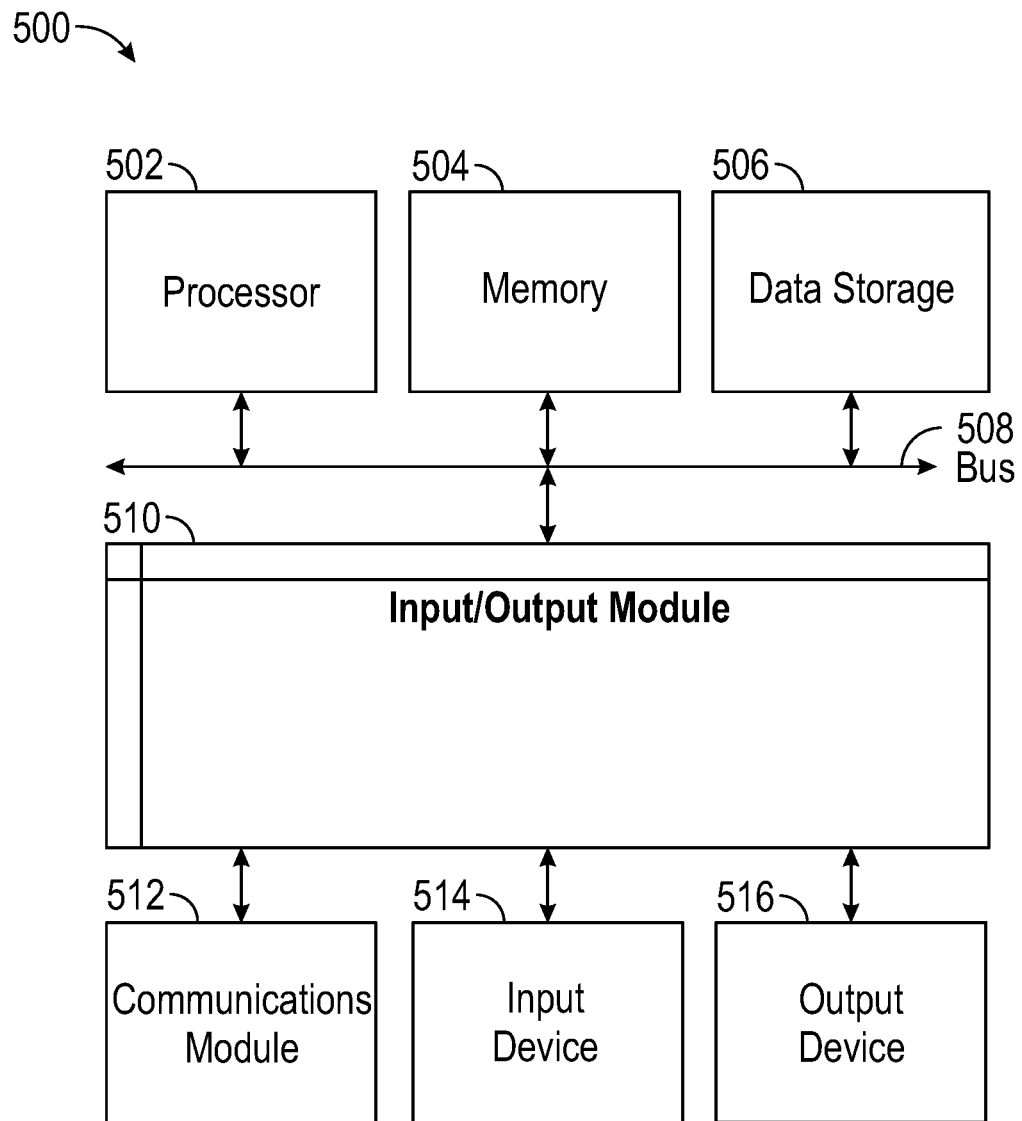
FIG. 5 is block diagram illustrating an example computer system with which the mobile device management server, threat feed server, push notification server, and managed device of FIG. 2 can be implemented.

FIG. 5 is a block diagram illustrating an example computer system 500 with which the mobile device management server 10, the threat feed server 12, the push notification server 14, and the at least one managed device 16, such as the first managed device 16a, of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the mobile device management server 10, the threat feed server 12, the push notification server 14, and the at least one managed device 16, such as the first managed device 16a) includes a bus 508 or other communication mechanism for communicating information, and a processor 502 (e.g., the processor 28, 34, 38, 42) coupled with bus 508 for processing information. According to one aspect, the computer system 500 can be a cloud computing server of an IaaS that is able to support PaaS and SaaS services.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., the memory 30, 36, 40, 44), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., the communications module 20, 22, 24, 26) include networking interface cards, such as Ethernet cards and modems.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure the mobile device management server 10, the threat feed server 12, the push notification server 14, and the at least one managed device 16, such as the first managed device 16a, can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multiprocessing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more.

Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
   receiving, at a mobile device management server from a threat feed server, at least one security statement;
   parsing the at least one security statement into parsed information;
   creating a custom threat feed of common vulnerabilities and exposures at least based on the parsed information;
   selectively creating an alert associated with one common vulnerability and exposure of the common vulnerabilities and exposures, wherein the alert comprises a remediation action associated with the one common vulnerability and exposure; and
   identifying at least one managed device for performing the remediation action of the alert, wherein the at least one managed device is managed by the mobile device management server.

2. The computer-implemented method of claim 1, further comprising:
   transmitting, based on the identifying the at least one managed device, a first message to a push notification server that causes the push notification server to notify the at least one managed device to communicate with the mobile device management server; and
   transmitting, responsive to the at least one managed device communicating with the mobile device management server based on the push notification, a second message to the at least one managed device, the second message comprising at least commands to execute instructions associated with the remediation action.

3. The computer-implemented method of claim 1, wherein the selectively creating the alert further comprises:
   selectively creating criteria associated with the one common vulnerability and exposure;
   selectively creating a trigger associated with the one common vulnerability and exposure; and
   selectively creating the remediation action.

4. The computer-implemented method of claim 3, wherein the remediation action is executed when the criteria agree with the trigger.

5. The computer-implemented method claim 3, wherein the criteria are created by defining fields comprising one of a criteria field, an operator field, and a value field.

6. The computer-implemented method of claim 3, wherein the trigger is selected from one of creating the one common vulnerability and exposure, updating an existing common vulnerability and exposure, and creating a remediation policy for the one common vulnerability and exposure.

7. The computer-implemented method of claim 3, wherein the remediation action is selected from one of transmitting a notification associated with the one common vulnerability and exposure, and transmitting instructions to execute a remediation policy.

8. The computer-implemented method of claim 1, wherein the at least one security statement is one of a common vulnerability and exposure object, a software update, a press release statement, and a private statement.

9. The computer-implemented method of claim 8, wherein the at least one security statement comprises one of a common vulnerability and exposure identifier, a security score, a severity level, software vendor comments, a software vendor name, an application name, an operating system name, an operating system version, a vulnerability type, an ease of exploit, configuration nodes, a publication date, a modification date, a declared configuration, previously patched software versions, and guidelines for patching.

10. The computer-implemented method of claim 1, wherein the receiving the at least one security statement is received at selected time intervals.

11. The computer-implemented method of claim 1, wherein the parsed information comprises one of a common vulnerability and exposure identifier, a security score, a severity level, software vendor comments, a software vendor name, an application name, an operating system name, an operating system version, a vulnerability type, an ease of exploit, configuration nodes, a publication date, a modification date, a declared configuration, previously patched software versions, and guidelines for patching.

12. A system comprising:
a memory storing instructions; and
a processor configured to execute the instructions which, when executed, cause the processor to:
receive, from a threat feed server, at least one security statement;
parse the at least one security statement into parsed information;
create a custom threat feed of common vulnerabilities and exposures at least based on the parsed information;
selectively create an alert associated with one common vulnerability and exposure of the common vulnerabilities and exposures, wherein the alert comprises a remediation action associated with the one common vulnerability and exposure;
identify at least one managed device for performing the remediation action of the alert, wherein the at least one managed device is managed by a mobile device management server;
transmit, based on the identifying the at least one managed device, a first message to a push notification server that causes the push notification server to notify the at least one managed device to communicate with the mobile device management server; and
transmit, responsive to the at least one managed device communicating with the mobile device management server based on the push notification, a second message to the at least one managed device, the second message comprising at least commands to execute instructions associated with the remediation action.

13. The system of claim 12, wherein the instructions to create the alert further comprising instructions to cause the processor to:
selectively create criteria associated with the one common vulnerability and exposure;
selectively create a trigger associated with the one common vulnerability and exposure; and
selectively create the remediation action.

14. The system of claim 13 wherein the remediation action is executed when the criteria agree with the trigger.

15. The system of claim 13, wherein the criteria are created by defining fields comprising one of a criteria field, an operator field, and a value field.

16. The system of claim 13, wherein the trigger is selected from one of creating the one common vulnerability and exposure, updating an existing common vulnerability and exposure, and creating a remediation policy for the one common vulnerability and exposure.

17. The system of claim 13, wherein the remediation action is selected from one of transmitting a notification associated with the one common vulnerability and exposure, and transmitting instructions to execute a remediation policy.

18. The system of claim 12, wherein the at least one security statement is one of a common vulnerability and exposure object, a software update, a press release statement, and a private statement.

19. A non-transitory machine-readable storage medium comprising machine-readable instructions for causing a processor to execute a method, the method comprising:
receiving, at a mobile device management server from a threat feed server, at least one security statement;
parsing, at the mobile device management server, the at least one security statement into parsed information;
creating, at the mobile device management server, a custom threat feed of common vulnerabilities and exposures at least based on the parsed information;
selectively creating, at the mobile device management server, an alert associated with one common vulnerability and exposure of the common vulnerabilities and exposures, wherein the alert comprises a remediation action associated with the one common vulnerability and exposure;
identifying at least one managed device for performing the remediation action of the alert, wherein the at least one managed device is managed by the mobile device management server;
transmitting, based on the identifying the at least one managed device, a first message to a push notification server that causes the push notification server to notify the at least one managed device to communicate with the mobile device management server; and
transmitting, responsive to the at least one managed device communicating with the mobile device management server based on the push notification, a second message to the at least one managed device, the second message comprising at least commands to execute instructions associated with the remediation action.

20. The non-transitory machine-readable storage medium of claim 19, further including instructions for causing the processor to execute the method comprising:
selectively creating, at the mobile device management server, criteria associated with the one common vulnerability and exposure;
selectively creating, at the mobile device management server, a trigger associated with the one common vulnerability and exposure; and
selectively creating, at the mobile device management server, the remediation action.

* * * * *